United States Patent [19]

Brown

[11] Patent Number: 5,104,006

[45] Date of Patent: * Apr. 14, 1992

[54] MIXING AND DISPENSING GUN WITH IMPROVED REMOVAL NOZZLE

[75] Inventor: Daniel P. Brown, West Haven, Ill.

[73] Assignee: Insta Foam Products, Inc., Joliet, Ill.

[*] Notice: The portion of the term of this patent subsequent to Feb. 19, 2008 has been disclaimed.

[21] Appl. No.: 581,981

[22] Filed: Sep. 14, 1990

Related U.S. Application Data

[63] Continuation of Ser. No. 732,614, May 10, 1985, Pat. No. 4,993,596.

[51] Int. Cl.$^5$ .................................................. B05B 1/00
[52] U.S. Cl. ..................................... 222/145; 239/123
[58] Field of Search ............... 222/136, 137, 145, 334; 239/123

[56] References Cited

U.S. PATENT DOCUMENTS

| | | | |
|---|---|---|---|
| 4,377,256 | 3/1983 | Commette et al. | 239/123 |
| 4,458,831 | 7/1984 | Holleran et al. | 222/145 |
| 4,469,251 | 9/1984 | Sperry et al. | 222/145 |
| 4,867,346 | 9/1989 | Faye et al. | 239/123 |

Primary Examiner—Michael S. Huppert
Assistant Examiner—Shari Wunsch
Attorney, Agent, or Firm—Lockwood, Alex, Fitzgibbon & Cummings

[57] ABSTRACT

According to the present invention, a gun is provided which has a valve assembly receiver and a product discharge valve assembly which are adapted to cooperate with each other and which may be readily and accurately secured together in a fast, fool proof manner. The product discharge valve assembly may be readily removed by hand without the use of tools, and misalignment between the inlet passages on the valve assembly and the outlet passages in the gun body are eliminated. The outlet and inlet ports respectively are aligned securely and positively by the combination of a V-grooved self-centering arrangement on the receiver and a counterpart arrangement on the discharge valve assembly. In a preferred embodiment further cooperating alignment is provided by a locking stud unit. The discharge valve assembly includes a reciprocable valve having a stem portion which may include a quick release lock arrangement for cooperation with an operating rod of the discharge gun, whereby the valve may be readily removed and replaced for maintenance in use.

4 Claims, 3 Drawing Sheets

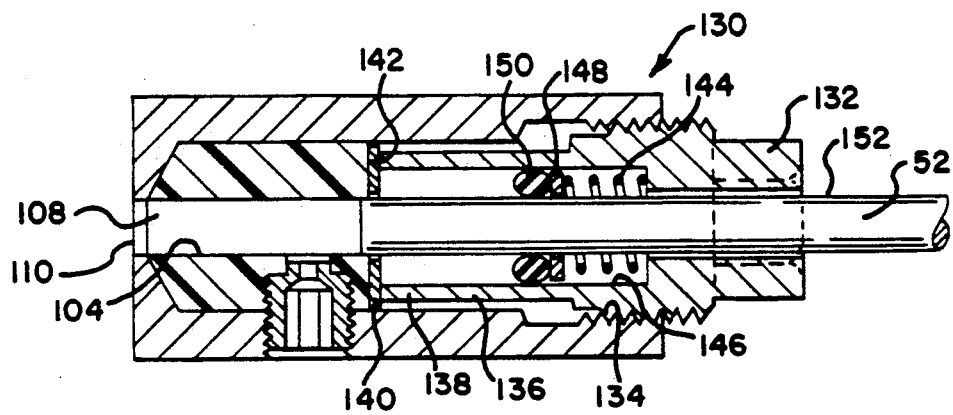
FIG_3_
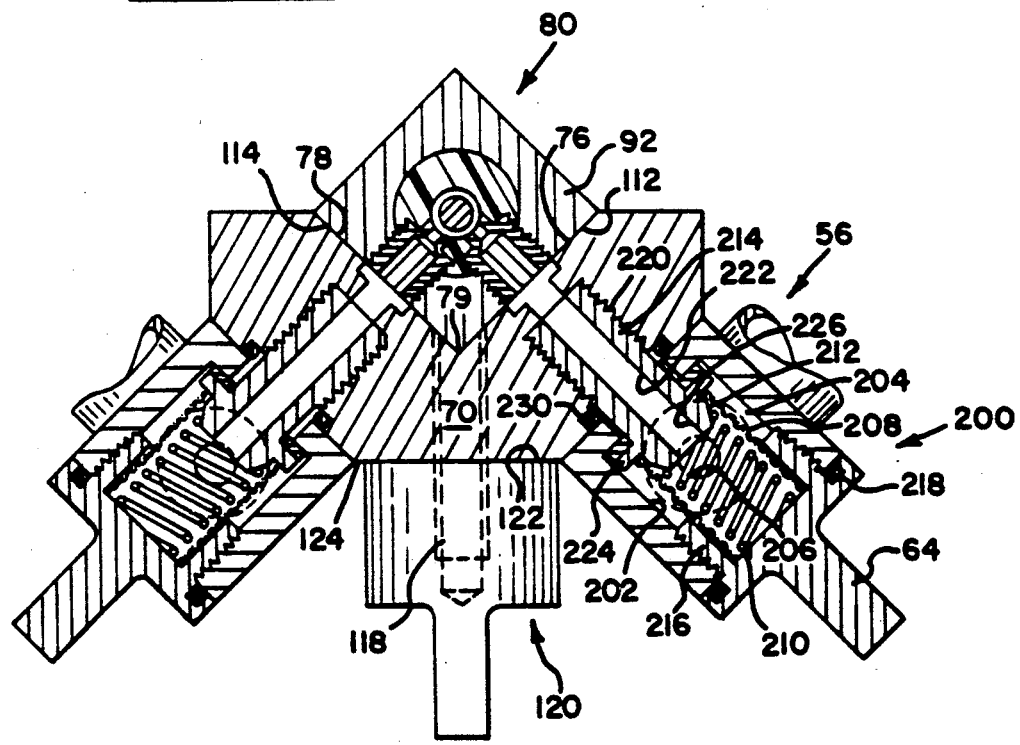
FIG_4_

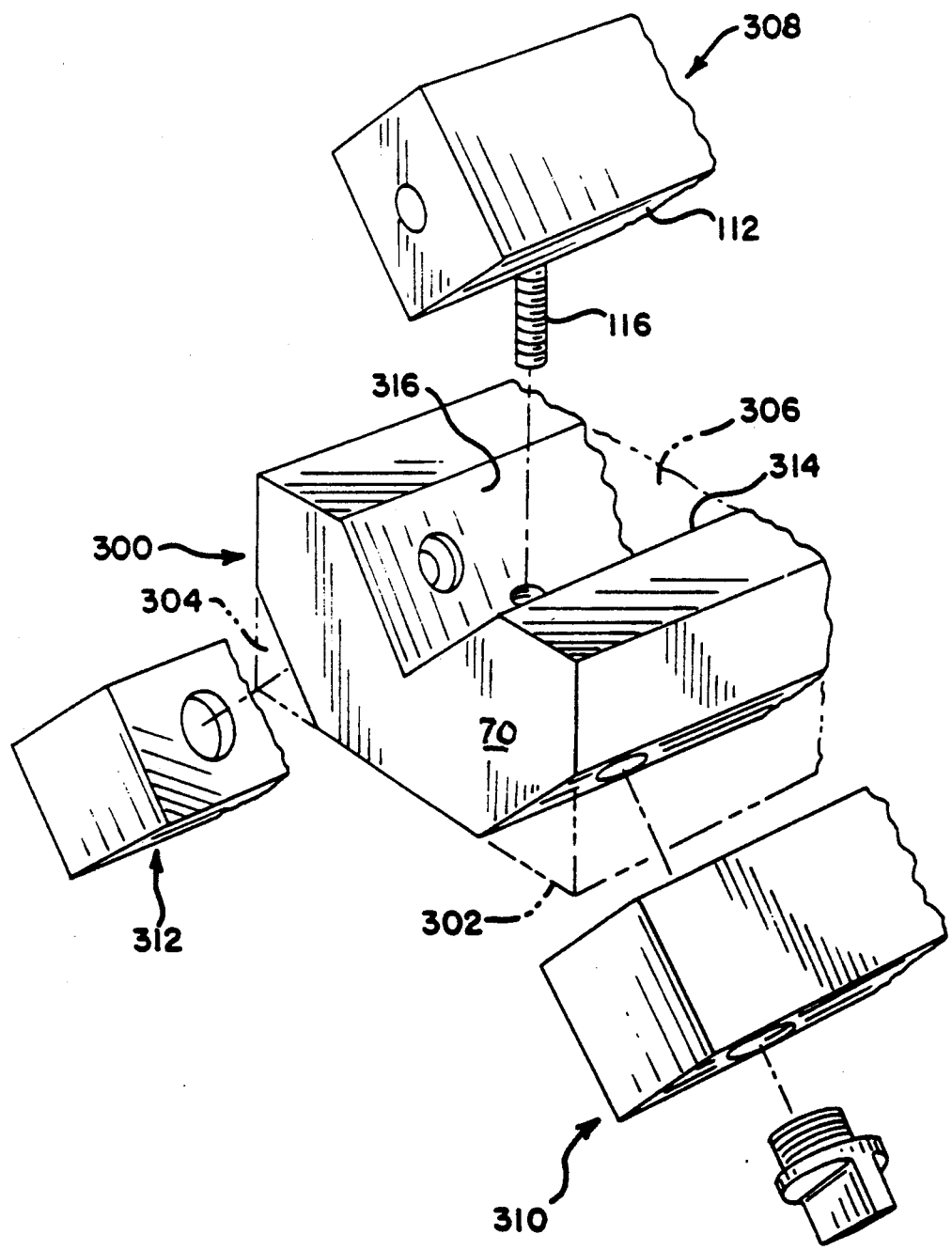
Fig-5-

MIXING AND DISPENSING GUN WITH IMPROVED REMOVAL NOZZLE

This application is a continuation of copending application(s) Ser. No. 732,614, filed May 10, 1985 now U.S. Pat. No. 4,993,596.

BACKGROUND OF THE INVENTION

The present invention relates generally to guns for mixing and discharging chemically reactive components adapted, upon mixing, to form a urethane or like insulating or projecting thermosetting plastic chemical foam, and more particularly, to a product mixing and dispensing gun having improved features providing ease of manufacturing, assembly, and maintanance, preferably through the use of low cost standard metal shapes.

In recent years, there has been continuing increase in the consumption of foam products made by reactive chemical components. In particular, polyurethane foam materials are being used in ever increasing quantities in the areas of thermal insulation, flotation, coatings, and most recently, in the area of mass, and semi-mass production of specialty packages. A common application of resilient, low density, but relatively high load bearing urethane foams has been in the specialty cushion packaging industry.

According to common practice, a corrugated, paperboard, or wooden shipping container is used to receive a relatively delicate product to be shipped by mail, freight, or other delivery service. Where the product is relatively delicate and expensive, and yet of considerable volume, perhaps a fraction of a cubic foot to several cubic feet or more in size, but is not mass produced to the extend that custom formed packaging is practical, it has been found desirable to package such products by a method which includes discharging pre-mixed but reacting urethane foam components into the container, placing a cover sheet over the reactants as they are polymerizing and the urethane is undergoing free rise expansion to its eventual height, placing the product to be packaged over the cover sheet as the foam continues to rise or has just finished rising, covering the product thus inserted into the package with another cover sheet and completing the package by surrounding the covered product with additional urethane foam, and permitting the remainder of the foam to expand to most or all of its final height before sealing the package.

In this manner, the expanding and reacting urethane foam assumes to contours of the product being packaged, and the product is completely and substantially evenly surrounded by a protective, shock absorbing cushion which also assumes the shape of the exterior container. This does away with the need for interfitting a product within intermediate packaging and then fitting such packaging to the shipping container. This method has proved very valuable for shipping medical and scientific instruments, electronic devices or various kinds, valuable artwork, china or other delicate objects, and a host of other products which would otherwise be readily susceptible to shipping and storage damage.

The advantages of these packaging systems are so great compared to many other packaging systems that there is a continuing increasing demand for the use of such systems.

According to present practices, the urethane components, a so-called resin or polyol component and a isocyanate component, are stored under high or ambient pressures in containers to which the discharge gun is attached by hoses. The materials are delivered to the mixing gun under high pressure from positive displacement pumps or other pumping means through the respective product hoses. Valves in the gun permit the products to flow through the hoses and into a mixing chamber, from which the products are mixed and dispended under the control of a trigger operated discharge valve.

Since the components are mixed by direct or indirect impingement with each other under conditions of very high pressure to insure thorough mixing, the design of the discharge valves and nozzles has become a matter of concern in the art. Common designs include those featuring single or complex seals, means for lubricating and/or rinsing valve elements which are periodically exposed to the reactive components and the like. A chronic problem in the area of guns used for this purpose is that of periodically removing the nozzle either for cleaning or for replacement.

In the prior art, if the nozzle, which receives the products under high pressure is not properly located and seated, leakage or damage to the nozzle may result. In the past, fitting of the valve assembly to the gun has been a time consuming difficult and unreliable process.

According to the present invention, a gun is provided which has a valve assembly receiver and a product discharge valve assembly which are adapted to cooperate with each other and which may be readily and accurately secured together in a fast, foolproof manner. The product discharge valve assembly may be readily removed by hand without the use of tools, and misalignment between the inlet passages on the valve assembly and the outlet passages in the gun body is eliminated.

According to the present invention, the outlet and inlet ports respectively are aligned securely and positively by the combination of a V-groove self-centering arrangement on the receiver, a counterpart arrangement on the discharge valve assembly, and a cooperating alignment and locking stud unit. The discharge valve assembly includes a reciprocable valve having a stem portion which may include a quick-release lock arrangement for cooperation with the operating rod of the discharge gun, whereby the valve may be readily removed and replaced for maintenance or otherwise.

In view of the failure of the prior art to provide a foam discharge gun which provides ready and reliable removal and replacement of the discharge valve assembly, it is an object of the present invention to provide a gun having a valve assembly receiver and valve assembly adapted for easy and reliable installation and removal.

Another object of the invention is to provide a gun which has the advantages of prior art guns, but which has further advantages in use, including the ability to locate and lock a product discharge valve assembly within a counterpart receiver without the aid of tools in a matter of few seconds or less.

Another object of the invention is to provide a so-called "pour gun" adapted to mix and dispense chemical products, which is easily serviceable for purpose of clearing the gun of chemical components, including reactive components, and of replacing components which become worn, clogged or damaged during use.

A further object of the invention is to provide a gun having a readily removable and replaceable discharge valve assembly which is compatible with the remaining elements of the gun, including an air operated free piston type actuator assembly.

A still further object of the invention is to provide a pour gun for mixing and discharging reactive chemicals, which gun has various mating surfaces which are easy to machine and finish, and which may be manufactured without the use of expensive tooling, and making use of common readily available inexpensive prefabricated shapes such as bar stock.

Yet another object of the invention is to provide a discharge valve assembly for a chemical product mixing and dispensing gun wherein the discharge valve assembly within the receiver of the gun is virtually incapable of misalignment, and which will seat equally well within a wide range of component tolerances.

Another object of the invention is to provide a valve assembly which includes a reliable seal and packing assembly to insure against leakage or clogging of the mixing and discharging valve assembly in the use of the gun.

The foregoing and other objects and advantages of the invention are achieved in practice by providing a gun which includes a handle and trigger, a pneumatically actuated free piston valve operating system, and a receiver adapted to receive a discharge valve assembly, with the receiver and the discharge valve assembly each including cooperative, flat side wall portions forming parallel sided V-shaped locating and locking surfaces, with a positioning and locking member adapted to cooperate further therewith for applying 'a locking force in the direction of the V-groove apex, and preferably with the discharge valve assembly including a fluorocarbon seat and a reciprocable flow control valve therein.

The exact manner in which the foregoing objects and advantages of the invention are achieved in practice will become more clearly apparent when reference is made to the following detailed description of the preferred embodiments of the invention set forth by way of example, and shown in the accompanying drawings, wherein like reference numbers indicate corresponding parts throughout.

BRIEF DESCRIPTION OF THE DRAWINGS

FIG. 3 is a vertical section view similar to that of FIG. 2, and showing the valve thereof in the open or discharge position; and FIG. 4 is a vertical sectional view of the receiver portion of the mixing and discharge gun body and showing the discharge valve assembly locked in position of use therein.

FIG. 5 is a perspective view of the preferred method of making the receiver for the discharge valve and component inlet valve assemblies of the invention.

DESCRIPTION OF THE PREFERRED EMBODIMENTS OF THE INVENTION

While it will be understood that the advantages of the invention may be derived with modified constructions, and that other products may be advantageously used with the apparatus of the present invention, a description of the preferred form of apparatus will be given wherein the chemicals to be mixed and discharged are two components of a urethane or isocyanate composition. The cross-section of the discharge valve assembly and its associated saddle or groove in the receiver, are shown as being square and of 90° V groove configuration, respectively having the advantages described herein, it being understood that other counterpart shapes may be used if desired.

Figure 1:
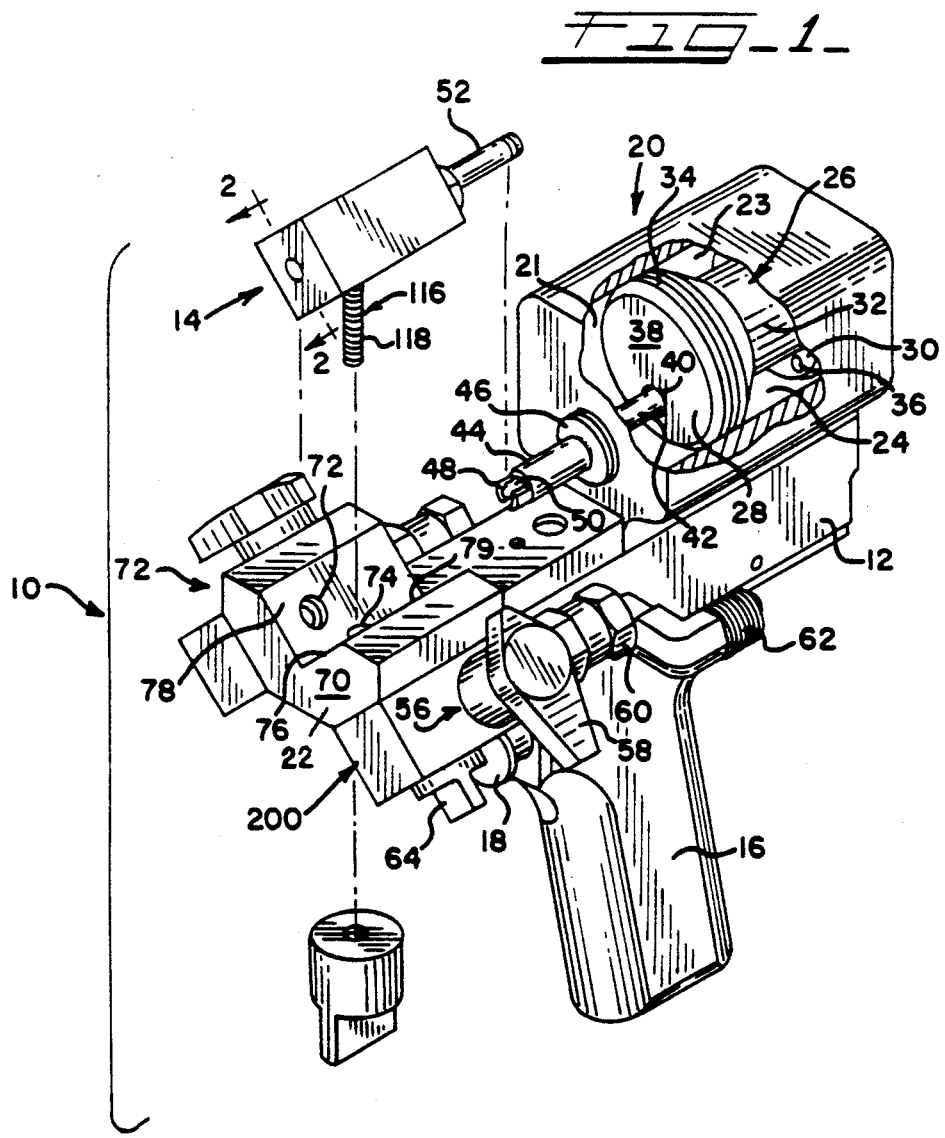
FIG. 1 is an exploded perspective view of the chemical mixing and dispensing gun of the present invention, showing the principal components thereof.

Referring now to the drawings in greater detail, FIG. 1 shows a product mixing and dispensing gun assembly generally designated 10, and shown to include a number of principal components, including a main frame unit 12, and a removable product discharge valve assembly 14.

The gun frame unit 12, in turn, includes various principal components including a pistol type hand grip 16 and a trigger 18, with the main frame unit 12 being provided with an air chamber housing generally designated 20, at one end thereof, and a valve carrier assembly generally designated 22, at the other end thereof.

The air chamber housing 20 includes an interior cylindrical side wall portion 24, receiving a free piston assembly 26, which in turn, includes a forward head 28 and a rear head 30, disposed on opposite ends of a center section 32,. The air chamber housing 20 is subdivided by the piston assembly 26 into forward and center chambers 21, 23, and a rear chamber (not shown) being located axially rearwardly of the read head 30. An O-ring type piston seal 34 is shown as providing an airtight fit for the forward piston head 28 within the wall 24, and the rear head 30 may be similarly equipped, if desired. The double headed piston arrangement 26 provides the guiding necessary to avoid piston cocking within the cylindrical sidewall or bore 24. A vent passage 36 is shown to be provided in the rear head 30 to permit the piston to reciprocate when pressure is alternately applied to the front and intermediate chambers 21, 23, as will appear.

The crown 38 of the forward piston head 38 includes an offset bore 40 therein, in which is received the shank portion 42 of a valve operating rod 44, which passes through the forward chamber 21 and through the pressure seal 46, and terminates in a coupler slot 48. The slot 48 receives a locking groove 50 on the stem portion 52 of the discharge valve 54. The gun main frame 12, is also shown to be provided with other elements, namely, a pair of product inlet valve assemblies each generally designated 56 and shown to include operating knobs 58. Hose connector fittings 60 extend outwardly from the valve assemblies 56 (one only shown in FIG. 1) and these fittings are adapted to receive the end portions of hoses (not shown), to which the product components respectively pass on their way towards the valve assembly.

FIG. 1 also shows that the gun frame 12 includes an air inlet fitting 62, and a pair of knobs 64, removable closing off flush ports (not shown in FIG. 1). The valve carrier portion 22 includes a carrier body 70, having substantially identical product outlet ports 72, and a central, vertically extending stud receiving bore 74 therethrough. As is shown in FIG. 1, the valve carrier body 70 includes substantially flat, tapered side wall portions 76, 78 arranged in V-groove form, with a line 79 running longitudinally of the gun frame axis and forming the apex of a downwardly directed V formed by the sidewalls 76, 78.

Figure 2:
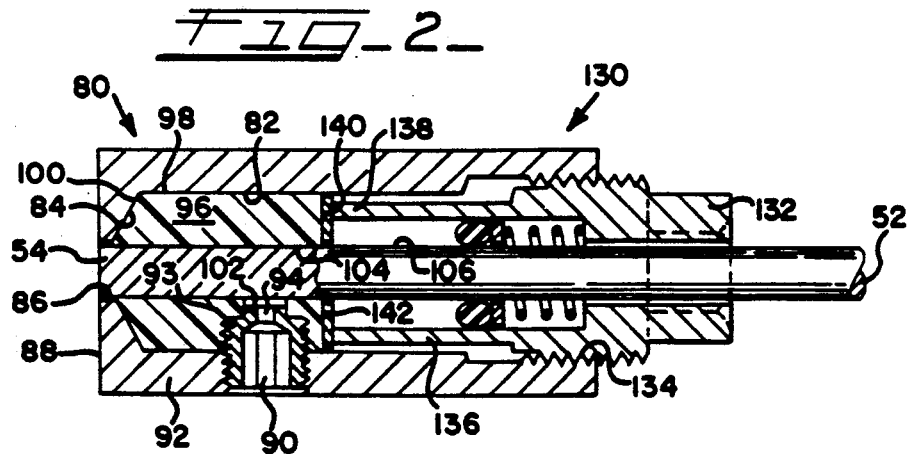
FIG. 2 is a vertical sectional view, on an enlarged scale, taken along lines 2—2 of FIG. 1 and showing the constructional details of the discharge valve assembly, with the valve in the closed position.

Referring now to the product discharge valve assembly 14, this unit is shown to include, as appears in FIGS. 2 and 3, a discharge valve housing generally designated 80, having a valve seat bore 82 extending generally longitudinally thereof and terminating in a tapered or beveled shoulder 84. A bore 86 is formed in the front face surface 88 of the housing 80. In addition, identical inlet passages 90 extend through the side wall portions 92 of the housing 80, and each is tapped or threaded so as to receive a jet 93 or the like having a discharge orifice 94 for the liquid product passing therethrough.

Received within the bore 82 in the housing 80, is a valve seat body 96 preferably made from a fluorocarbon material and shown to include a generally cylindrical outer surface 98, which is press fit within the housing bore 82. The valve seat body 96 terminates at its forward edge in a tapered nose 100, and the seat 96 is also bored so as to provide product inlet passages 102 therein. The seat body 96 also includes a central flow control valve bore 104, which slideably but snugly receives the outer surface 106 of the valve stem 52. The stem reciprocates within the bore 104 in fluid-tight relation, and when the valve stem 52 is forcibly withdrawn, as shown in FIG. 3, the openings 102 in the seat body 96 are uncovered, and product passes rapidly therethrough and into the mixing chamber 108 under high pressure. Thorough mixing takes place in the chamber. Because of the high pressure under which the chemicals are stored, mixing is immediate and discharge from the outlet passage 110 in the valve seat bore 82 is also substantially immediate.

As shown in FIGS. 4 and 5, the side walls 92 of the valve housing 80, have exterior surfaces 112, 114, which are shaped and finished identically to their counterpart surfaces 76, 78 in the valve carrier 22. As also shown in FIGS. 1 and 4, positioning and alignment means in the form of a positioner stud 116 is affixed to and extend downwardly from the lower portion of the valve housing 80. The lower or shank portion 118 of the stud 116 is threaded so as to receive a locking wing nut 120 thereover. The face portion 122 of the wing nut 120 engages the flat lower surface 124 on the carrier assembly 22 to insure that the valve may be tightened appropriately for tight seating.

Referring now to FIG. 4, the gun of the invention derives a number of its advantages from a simple, modular construction. As shown in FIG. 4, each product inlet valve assembly 56 is identical to its counterpart, and is contained in a housing generally designated 200. The housing includes sidewalls 202 defining a product passage 204 through which the product pass from the opening 206 in the inlet fitting 60 (FIG. 1). Fluid passes through a screen mesh filter 208 held in place by an axially acting coil spring 210 which is received over a tapered surface 212 on a combination fastener and jet 214. The housing 200 includes a clean out opening closed off by the knob 64 which includes a coup 216 for receiving the spring and filter assembly for locating it. An O-ring seal 218 seals the clean out knob 64 against leakage relative to the housing 200. The combination fastener and jet includes a threaded shank 220 on its one end, a central product passage 222, and an enlarged diameter shoulder 224. The end of the fastener 214 may include a socket head or like opening 226 to facilitate assembly and disassembly. In use, the product flows through the fitting 60, into the chamber 204, through the filter screen 208 held in place by the screw 210 and discharges through the passage 222 in the jet 214. The housing 202 is secured at its inner end by an O-ring 230 held in a portion of the valve carrier assembly body 70.

Referring now to another aspect of the invention, it is known that, because of the high presssure under which components are fed to the discharge valve assembly, whether by reason of being fed to positive displacement pumps or from pressurized containers, the tendency of the product to leak along the interface between the fluorocarbon valve body and the exterior diameter of the valve stem is substantial. In order to counteract this tendency, it may be desirable to provide a hydrostatic seal on the side of the assembly opposite the discharge opening, and in this case, to the rear of the gun as shown in FIG. 1.

For this purpose, and referring to FIG. 2 and 3, a seal assembly generally designated 130 is provided which combines two features using a minimum of parts. The functional features provided are the sealing of the hydraulic oil or like fluid in a chamber to the rear or operating rod side of the valve, and the simultaneous provision of means for insuring against cold flow of the fluorocarbon or other resinous valve body. Where a fluorocarbon material is used as a valve body, which is desirable because fluorocarbons have a surface which is non-adherent to the reaction product of the components, such material is known to undergo visible and undesirable cold flow if unconfined.

As a consequence, the seal of the invention provides a dynamic seal between the valve stem and the adjacent portions of the valve housing, while at the same time providing a mechanically adjustable end face seal which serves to bear upon the rear end face o the valve body. Accordingly, and referring now to FIGS. 2 and 3, when the compression fitting 132 is inserted and locked in the threaded recess 134 in the valve housing 80, the fitting nose portion 138 of the cylindrical barrel portion 136 of the fitting 132 engages a washer 140 or like force-applying element, urging it strongly against the rear end face surface 142 of the valve seat 82. AT the same time, the coil or like spring 144 in the smaller diameter recess 146 urges a washer or backup plate 148 against the O-ring 150 which seals both on the OD 152 of the valve stem and the ID 146 of the fitting 132. With this construction, a hydrostatic seal is provided and the pressure attainable in the seal chamber is limited only by the force available from the spring 144. This prevents creep or backward flow of the components of their reaction product along the ID surface 104 of the valve seat body 96.

In other embodiments, the valve stem 52 may be lubricated or cleaned periodically by the provision of a wick, spray nozzle or the like (not shown). In any case, these components are made from readily available materials and form a portion of the product discharge valve assembly which may be made at low cost and used with the gun of the invention.

Referring now to FIG. 5, another important aspect of the invention is shown. This resides principally in the ease with which the gun member may be manufactured from readily available stock using existing materials and equipment. While the invention is most advantageously practiced when manufactured by the aid of so-called CNC machining (computer numerical control) machining, the advantages of the invention are also achieved with lower volume production methods. In any case, the valve carrier assembly itself is made from solid aluminum bar stock which is basically rectangular in cross-section and of the desired length. This bar stock may then be milled with two simple side cuts and a single V-groove cut at the top to prepare it for mounting the valve housing 90 and the product valve and filter block assemblies.

Thus, referring to FIG. 5, there is shown an element of bar stock 300, formed in a rectangular shape. In this shape, simple planar cuts are milled, removing the material shown in phantom lines 302, 304, 306. These cuts result in making the body 70 of the valve carrier 22 in the cross-sectional form shown in FIG. 4. Thereupon, three additional elements, namely, the element 308 from which the valve housing 80 is made, and two additional elements 310, 312, from which the product inlet valve and filter assemblies are made are provided. These shapes are preextruded to the desired square cross-section, and if necessary, may be finished, polished or surface ground on their abutting surfaces 112, 114 and so that a proper fit against the milled carrier surfaces 314, 316 may be achieved. The various openings in the body of the carrier and in the valve housing 80, as well as in the valve and filter block assemblies 200 are then drilled and tapped, using CNC or automatic screw machine techniques. Fittings, where necessary, are conveniently made on automatic screw machines or taken from standard parts inventory.

Accordingly, it is not necessary, in forming the product discharge valve assembly 14, or in the component valve and filter bodies 200, to provide special tooling, centerless grinding, or other expensive operations. These advantages are particularly important where the guns are desired to be produced at low cost or used in an environment wherein frequent component replacement may be required.

According to the invention, the elements of the gun contacted by the fluid components are readily replaceable at low cost and do not require mechanical skill for their removal and replacement.

The gun 10 of the invention operates in a customary manner. Because of the high friction between the exterior surface of the valve stem 52 within the fluorocarbon resin valve seat 104, considerable force is needed to open and close the main product discharge valve 14. Consequently, in the operation of the gun, after the fitting 62 has been affixed to a pneumatic hose providing a shop air pressure of 60-120 PSI, for example, and after the fittings 60 have been connected to component supply hoses served by pumps or pressurized containers, the gun is ready to operate.

Thereupon, the knobs 58 are manipulated into the "on" position so that the valve 56 in the housings 200 are open. Individual components then flow through the various passages to the discharge orifices 94 and the jets 92. When it is desired to discharge a shot of foam, the trigger 18 is depressed. This opens a passage (not shown) which introduces high pressure air into the forward chamber 21, pushing the piston assembly 26 to the rear and pulling the rod 52 to the position where the inlet passages 94 are uncovered (FIG. 3). Product flows through the orifices are previously described and is mixed in the chamber 108, immediately prior to discharge. When the trigger is released, the forward chamber 21 is vented, the intermediate and rear chambers 23 are pressurized, and the piston 28 moves forward, pushing the valve stem 52 to the position of FIG. 2. This completely stops product flow.

Consequently, the gun operates in a bitable mode, with the trigger pull positively pushing the piston to the rear and actuating the main product discharge valve, with the valve being held open by the piston against line air pressure. When the trigger is released, the piston is positively closed.

When it is desired to service the unit, the knobs 64 are pulled and the filters 208 removed. The nozzle assembly 14 may also be cleaned in a known manner and the gun passage cleaned in the same way. This is carried out in a simple and straightforward manner. If any additional components are required to be removed, this may done with simple tools.

It will thus be seen that the present invention provides a mixing and dispensing gun with improved removal nozzle having a number of advantages and characteristics, including those pointed out herein and others, which are inherent in the invention.

A preferred embodiment having been described by way of example, it is anticipated that various changes and modifications to the described form of apparatus may be made by those skilled in the art without departing from the spirit of the invention or the scope of the appended claims.

I claim:

1. A hand held gun for discharging a mixture of two chemically reactive components, said gun being adapted to direct said components to an impingement mixing passage in which said components are mixed immediately prior to discharge, and wherein said components are substantially simultaneously admitted to said mixing passage under the control of a single valve stem, said gun comprising, in combination, a gun body including a handle, a trigger, an air cylinder and a reciprocable piston disposed therein, means defining an air circuit for operating said piston, means for connecting said piston to a product discharge valve, said gun further including a removable valve body and a valve carrier member, said valve body including a pair of product component inlet ports, a cylindrical sidewall defining an impingement mixing passage through said valve body, and a reciprocable valve stem received in and movable through said passage, seal means for preventing flow or product between said cylindrical sidewall and said valve stem, means on said valve stem for cooperation with said piston connection means to facilitate removable connection therewith, said carrier member and said valve body each having planar, mutually cooperating side wall surfaces arranged in a V-shaped cross section, and means for positively aligning said carrier member and valve body in a desired directional relation and manually operable clamping means for urging said valve body and said carrier member into snug sealing engagement with each other such that the apex of the V-shaped section on the valve body is disposed adjacent the apex of the V-shaped section of the carrier member.

2. A gun as defined in claim 1, wherein said valve body portion comprises a block of fluorocarbon material and wherein said gun includes means for exerting a compressive pressure on said valve body to prevent cold flow deformation thereof.

3. A hand held gun for discharging a mixture of two chemically reactive components, said gun being adapted to direct said components to an impingement mixing passage in which said components are mixed immediately prior to discharge, and wherein said components are substantially simultaneously admitted to said mixing passage under the control of a single valve stem, said gun comprising, in combination, a gun body including a handle, a trigger, an air cylinder and a reciprocable piston disposed therein, means defining an air circuit for operating said piston, means for connecting said piston to a product discharge valve, said gun further including a removable valve body and a valve carrier member, said valve body including a pair of product component inlet ports, a cylindrical sidewall defining an impingement mixing passage through said valve body, and a reciprocable valve stem slidably received in and movable through said passage in fluid tight relation therewith, means on said valve stem for cooperation with said piston connection means to facilitate removable connection therewith, said carrier member and said valve body each having planar, mutually cooperating side wall surfaces arranged in a V-shaped cross section, and means for positively aligning said carrier member and valve body in a desired directional relation and manually operable clamping means for urging said valve body and said carrier member into snug sealing engagement with each other such that the apex of the V-shaped section on the valve body is disposed adjacent the apex of the V-shaped section of the carrier member.

4. A gun as defined in claim 3, wherein said valve body portion comprises a block of fluorocarbon material and wherein said gun includes means for exerting a compressive pressure on said valve body portion to prevent cold flow deformation thereof.

* * * * *